United States Patent [19]
Harwood et al.

[11] Patent Number: 5,958,563
[45] Date of Patent: Sep. 28, 1999

[54] FLOOR COVERINGS AND FILMS FOR USE THEREIN

[75] Inventors: Ivor Charles Harwood, Leicestershire; Gary John Wilson; Keith Melvin Jones, both of Coventry, all of United Kingdom

[73] Assignee: The Amtico Company Limited, Coventry, United Kingdom

[21] Appl. No.: 08/754,576

[22] Filed: Nov. 21, 1996

[30] Foreign Application Priority Data

Nov. 21, 1995 [GB] United Kingdom ................... 9523781

[51] Int. Cl.$^6$ .............................. E04F 15/00; B32B 27/20
[52] U.S. Cl. ......................... 428/212; 428/213; 428/220; 428/515; 428/516; 428/203; 428/206; 428/520; 264/173.12; 264/173.14
[58] Field of Search ..................................... 428/515, 516, 428/213, 203, 206, 44, 46, 212, 220, 520; 264/173.16, 173.18, 173.12, 173.14

[56] References Cited

U.S. PATENT DOCUMENTS

| | | | |
|---|---|---|---|
| 3,660,216 | 5/1972 | Theodorson | 40/615 |
| 4,263,080 | 4/1981 | Whiting, Jr. | 156/244.11 |
| 5,316,861 | 5/1994 | Marchal et al. | 428/516 |
| 5,728,476 | 3/1998 | Harwood et al. | 428/500 |

FOREIGN PATENT DOCUMENTS

| | | |
|---|---|---|
| 0 228 041 | 12/1986 | European Pat. Off. . |
| A-228041 | 12/1986 | European Pat. Off. . |
| 0 338 402 | 4/1989 | European Pat. Off. . |
| 0 347 745 | 6/1989 | European Pat. Off. . |
| 347745 | 12/1989 | European Pat. Off. . |
| 0 470 760 | 2/1992 | European Pat. Off. . |
| 0 621 128 | 10/1994 | European Pat. Off. . |
| 41 07 150 | 9/1992 | Germany . |
| 977 550 | 9/1964 | United Kingdom . |
| WO 95/08593 | 5/1995 | WIPO . |

OTHER PUBLICATIONS

Derwent WPI Accession No. AN 82–91107E & JP 57 149 564 A, Sep. 1982.
Derwent WPI Accession No. An 85–033479 & JP 59 225 952 A, Dec. 1984.
Ulmann's Encyclopedia of Industrial Chemistry vol. A11—Editor Gerhartz.

*Primary Examiner*—Paul Thibodeau
*Assistant Examiner*—D. Lawrence Tarazano
*Attorney, Agent, or Firm*—Pennie & Edmonds LLP

[57] ABSTRACT

A thermoplastic solid backing film manufactured by the co-extrusion of three polymer compositions wherein die-lip build up is avoided by adjusting the amount of filler present in each polymer composition. The first and third polymer compositions are such that substantially no die-lip build up occurs when these compositions are extruded through a die however the second polymer composition is such that there would be substantial die-lip build up if it was extruded adjacent a die-lip. The presence of the first and third polymer compositions prevents the second polymer composition from contacting the die-lip during manufacture of the backing film. The thermoplastic solid backing film can be incorporated in a resilient floor covering and in floor tiles.

29 Claims, 3 Drawing Sheets

5,958,563

FLOOR COVERINGS AND FILMS FOR USE THEREIN

TECHNICAL FIELD

This invention relates to the manufacture of extruded films, to the extruded films so made and to floor coverings, particularly resilient floor coverings, containing such films as backing films.

BACKGROUND ART

Resilient floor coverings are well-known and are described for example in an article entitled "Flooring Materials" in Encyclopaedia of Polymer Science and Engineering, Wiley-Interscience, 3rd edition, Volume 7 (1987), pages 233–247, and in an article entitled "Floor Coverings" in Ullmann's Encyclopaedia of Industrial Chemistry, VCH Publishing, 5th edition, Volume All (1988), pages 270–274. Resilient floor coverings are commonly composite laminates constructed from a number of plastics film layers, each layer being specially formulated for a particular duty. Thus, the topmost film, which is commonly called the wear layer, is formulated for good resistance to abrasion and wear. The wear layer may be transparent, so that the coloring or patterning of one or more lower films can be seen through it, in which case it is commonly called a clear wear layer. Such a clear wear layer generally overlies a pigmented film which is solid in color, for example white. Such a pigmented film is commonly called a face ply. A printed patterned film is generally interposed between the clear wear layer and the face ply, the presence of the face ply serving to enhance the visual appearance of the pattern as seen through the wear layer. The undermost film of the composite is commonly referred to as the backing layer and is often pigmented black. It may be embossed on the underside with a pattern, produced for example by pressing against a fabric belt, to provide good adhesion to the underlying floor. Alternatively, the floor covering may comprise a backing fabric adhered to the underside of the backing layer. In the construction known as cushion flooring the composite may contain a foam layer between the face ply and the undermost backing. The solid backing films, which include the face ply and the backing layer, are generally highly-filled thermoplastic materials. The films which lie between the wear layer and the backing may be referred to as interior films. The compositions of all the layers in the composite must be balanced to ensure that the floor covering has the correct balance of properties; for example insulating and sound-absorbing properties, and in particular freedom from a tendency to curl. Economic factors must also be borne in mind.

Resilient floor coverings based on plasticised PVC, which are commonly known as vinyl sheet and tile flooring, have enjoyed considerable commercial success but suffer from a number of disadvantages. PVC is slightly yellow and tends to become more yellow on exposure to the amounts of UV light commonly occurring in interior environments. The clarity of clear PVC wear layers and the visual appearance of patterned printed layers seen through such wear layers are not as great as could be desired. The resistance of vinyl floor coverings to wear, abrasion, scratching and scuffing is not as great as could be desired. The use of vinyl floor coverings has been objected to on environmental grounds, both in that they contain the chlorinated polymer PVC and in that they contain volatile organic compounds such as plasticizers. Proposals have been made for the manufacture of resilient floor coverings which overcome some of these disadvantages, in particular by reason of being based on thermoplastic polymer compositions which are essentially chlorine-free, as described for example in WO-A-95/08593.

In the manufacture of vinyl flooring, films, including the solid backing films, are commonly made by calendering techniques.

Calendering is well-suited to the manufacture of highly-filled vinyl films. In contrast, many of the polymers suitable for the manufacture of chlorine-free resilient floor coverings can be extruded, but cannot readily be calendered. The extrusion of highly-filled films of such polymers has been found to present practical difficulties. Polymer, often enriched with filler, tends to accumulate on the outer surface of the lips of the extrusion die in the phenomenon known as die-lip build-up. The accumulated polymer tends to become degraded as a consequence of remaining exposed at the hot exterior surfaces of the die lips. The accumulated polymer tends from time to time to break away from the lips of the die, whereupon it may become embedded in the surface of the film, thereby degrading film quality. The minimum proportion of filler at which this effect occurs depends to some extent on the nature of the composition, including the type of polymer and filler employed, and on the extrusion conditions, but we have determined that it is often of the order of 30 or 40 percent by weight for spherical fillers or of the order of 20 or 25 percent for plate-like fillers. It is an object of the invention to provide a method of manufacturing highly-filled extruded films for use as solid backing films in resilient flooring coverings which does not suffer from the problem of die-lip build-up.

EP-A-228041 describes a coextruded multilayer material having a thermoplastic core layer with at least one inorganic or organic constituent dispersed therein, sandwiched between thermoplastic outer layers substantially free of such particles. This form of construction serves to reduce the tendency of colorants, especially organic dyes, to migrate to the surface of a monolayer extruded article during and after the extrusion process, which may result in damage to the extruder, cross-contamination and color defects. It also serves to reduce the tendency of reinforcing agents to break through the surface of a monolayer extruded article during extrusion, which may result in poor quality product and ultimately in damage to the extruder. The total amount of inorganic or organic constituents generally ranges from about 1 to about 40 percent by total weight of the multilayer material.

EP-A-347745 describes a coextruded multilayer film structure containing a high percentage of fillers. The fillers are concentrated in a filler-containing layer which amounts to no more than about 5 to about 20 percent, preferably no more than about 10 percent, of the thickness of the total multilayer film. The filler-containing layer may contain about 15 to about 60 percent by weight filler. The filler-containing layer may be joined to a relatively thick base layer or may be sandwiched between two such relatively thick base layers. The base layers may contain 1 to 15 percent by weight conventional whiteners such as titanium dioxide or calcium carbonate. The base layer or layers serve to support the filler-containing layer, which is brittle and easily torn.

SUMMARY OF THE INVENTION

According to the present invention there is provided a thermoplastic solid backing film for inclusion in a floor covering, characterised in that it is a coextruded film comprising in sequential order:

(1) A first lamina having a first thermoplastic polymer composition with a first proportion of filler;

(2) A second lamina having a second thermoplastic polymer composition with a second proportion of filler; and (3) A third lamina having a third thermoplastic polymer composition with a third proportion of filler;

the first and third thermoplastic compositions being such that when the first and third laminae were extruded through the die there was substantially no die-lip build up, and the second thermoplastic composition being such that if the second lamina were to be extruded adjacent a die lip there would be significant die lip build up, the first and third laminae having prevented the second lamina from contacting the die during manufacture of the film.

The film is preferably produced by coextruding through a die in the following order:

(1) a first lamina which consists of a first thermoplastic polymer composition comprising from zero to about 30 percent by weight infusible filler;

(2) a second lamina which consists of a second thermoplastic polymer composition comprising about 50 to about 75 percent by weight infusible filler; and (3) a third lamina which consists of a third thermoplastic polymer composition comprising from zero to about 30 percent by weight infusible filler, whereby the occurrence of die-lip build-up is avoided.

Another aspect of the invention relates to a method of manufacturing a thermoplastic solid backing film for inclusion in a floor covering, the film being produced by co-extruding through a die in the following order;

(1) A first lamina having a first thermoplastic polymer composition with a first proportion of filler;

(2) A second lamina having a second thermoplastic polymer composition with a second proportion of filler; and (3) A third lamina having a third thermoplastic polymer composition with a third proportion of filler;

the first and third thermoplastic compositions being such that as the first and third laminae are extruded through the die there is substantially no die-lip build up, and the second thermoplastic composition being such that if the second lamina were to be extruded adjacent a die lip there would be significant die lip build up, the first and third laminae ensuring that the second lamina does not contact the die lip avoiding any die lip build up of the second thermoplastic polymer composition.

The thermoplastic solid backing film for inclusion in a floor covering is preferably a coextruded film comprising in sequential order:

(1) a first lamina which consists of a first thermoplastic polymer composition comprising from zero to about 30 percent by weight infusible filler;

(2) a second lamina which consists of a second thermoplastic polymer composition comprising about 50 to about 75 percent by weight infusible filler; and (3) a third lamina which consists of a third thermoplastic polymer composition comprising from zero to about 30 percent by weight infusible filler.

In the method or backing film of the first or second aspect of the invention the first composition (layer) may have from about 1 to 30 percent by weight infusible filler, or from about 5 to 30, or from about 15 to 30 percent by weight infusible filler. Similarly, the third composition (layer) may have the same range of filler.

The film may have at least about 50% or at least about 60% or at least about 70% by weight infusible filler. The filler may in any polymer composition (or in more than one of them) be disposed in a thermoplastic matrix.

The thermoplastic polymers utilised in the first, second and third laminae may be the same or different and may be any extrudible polymer suitable for use in solid backing films for inclusion in resilient floor coverings. Examples of suitable polymers include ethylene/vinyl acetate copolymers and ethylene/alkyl acrylate, for example methyl or butyl acrylate, copolymers. The first and third thermoplastic polymer compositions may be the same or different. The first and third polymer compositions may additionally comprise a small proportion, for example about 5 to 10 percent by weight, of a binder polymer, for example an ethylene/alkyl acrylate/maleic anhydride terpolymer, to provide good adhesion to adjacent films in a composite laminate floor covering. The polymer compositions may additionally comprise minor proportions of substances such as lubricants, antioxidants and stabilizers which are generally known in the art.

The infusible filler may comprise any filler or mixture of fillers known in the art. Examples of suitable fillers include inorganic substances such as calcium carbonate, hydrated aluminium oxide, kaolin and other particulate and fibrous materials. The infusible filler may additionally comprise a proportion, generally a minor proportion, of one or more pigments, for example a white pigment such as titanium dioxide or a black pigment such as carbon black. For example, a lamina in the film of the invention may comprise about 1 to 20 percent by weight titanium dioxide or about 1 to 5 percent by weight carbon black as part of the infusible filler. It will be appreciated that, although many such fillers and pigments melt or fuse at high temperatures, they are infusible at the temperatures encountered during the extrusion of plastics materials, and the word "infusible" is to be understood herein in the latter sense.

The thickness of a coextruded film according to the invention is commonly in the range of about 100 to 2000 micron, often about 500 to 1500 micron.

The thickness of the second lamina is as a rule at least about 45% and generally amounts to at least about 80%, preferably at least about 90%, of the total thickness of the coextruded film. This permits the manufacture of films with desirably high overall contents of infusible filler, for example at least 50, 55 or 60 percent by weight, and up to 70 or 75 percent by weight. The thickness of the first and third laminae may be the same or different and is generally in the range of about 10 to 100 micron, preferably about 20 to 50 micron. The first and third laminae may be any color including black. The thickness of the first and third laminae must be such that the laminae are opaque. When it is desirable to change the color of the first laminae the new color may be added to the formulation of the third lamina before the supply of the original color to the first lamina is stopped so that the new color is well established in the third lamina before the color of the first lamina fades. The film can then be turned over such that the third lamina, being the desired new color, forms the colored first lamina of the backing film and the original first layer forms the third lamina.

To enable the first and third laminae of the backing film to be intechangeable it is desirable to have substantially the same amount of filler in each of the first and third polymer compositions. Having a high proportion of filler, such as. about 70% by weight, in the first and third laminae may cause the film to curl. In an embodiment of the invention the film is extruded with a filler content of about 70% by weight in the first lamina and about 50% by weight in the third lamina to overcome the problem of the film curling. When a new color is added to the third lamina the filler content may also be altered, to ensure that when the film is turned over the new first (third) lamina has a higher filler content than the new third (first) lamina.

It will be understood that the backing film of the invention may comprise one or more interior laminae additional to the second lamina, provided always that the first and third laminae are disposed at the exterior of the film. Particularly when adjacent laminae comprise different polymers, the film of the invention may additionally comprise a layer of extrudible polymeric adhesive between such adjacent laminae, in the manner known in coextrusion technology.

The method of the invention may be implemented by means of conventional coextrusion equipment.

The invention further provides a composite laminate resilient floor covering characterised in that it comprises at least one coextruded backing film of the invention or made by the method of the invention.

The invention provides a floor tile that comprises at least one coextruded backing film of the invention or made by the method of the invention.

The tile may have two backing layers.

The tile may have a transparent or translucent wear layer.

The tile may have a decorative patterned layer.

The invention further provides a box of more than one floor tile wherein each floor tile comprises at least one coextruded backing film of the present invention or made by the method of the invention.

BRIEF DESCRIPTION OF THE DRAWINGS

The invention will now be described with regard to the accompanying drawings, in which.

DETAILED DESCRIPTION OF THE PREFERRED EMBODIMENT

Figure 1:
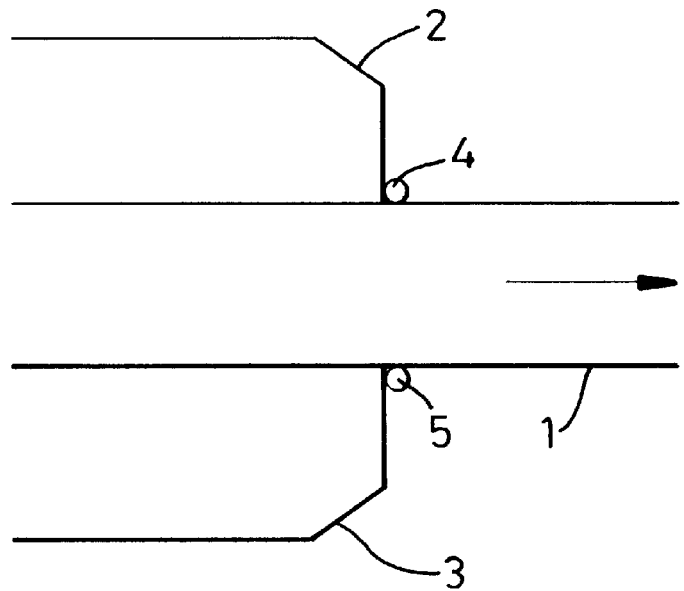
FIG. 1 is a schematic cross-sectional illustration of the extrusion of a filled backing film according to the prior art, exemplifying the problem of die-lip build-up.

Referring to FIG. 1, a film 1 of a highly-filled thermoplastic polymer composition containing for example 50 or 60 percent by weight filler is extruded in the direction of the arrow through a die having lips 2, 3. Filler-enriched portions of the polymer 4, 5 accumulate on the outer surface of the die lips 2, 3 (die-lip build-up). where they tend to become degraded and from where they tend to break away from time to time.

Figure 2:
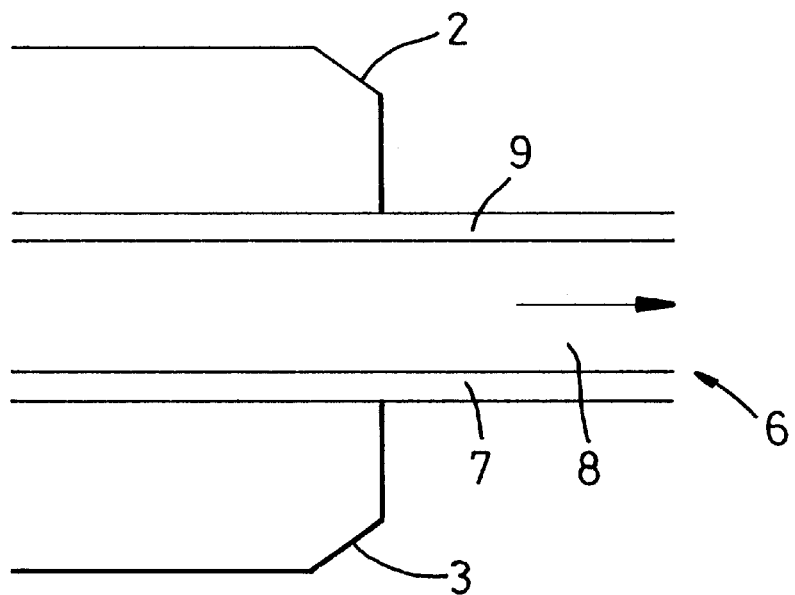
FIG. 2 is a schematic cross-sectional illustration of the extrusion of a filled backing film according to the invention.

Referring to FIG. 2, a film 6 comprising in sequential order three laminae 7, 8 and 9 consisting respectively of first, second and third thermoplastic polymer compositions is coextruded in the direction of the arrow through a die having lips 2, 3. The first and third polymer compositions comprise relatively low proportions of filler, for example about 5 to about 30 percent by weight. The second polymer composition comprises a relatively high proportion of filler, for example about 50 to 75 percent by weight. The overall filler content of the film is for example 50 or 60 percent by weight. The highly-filled interior lamina 8 provides about 80% of the total thickness of the film. The die lips 2, 3 are free from die-lip build-up.

Table 1 below shows the bead size in millimeteres (mm) of the die-lip build up occurring over a period of 6 hrs when the amount of filler in the first and third polymer compositions is changed from 5% by weight through to 40% by weight. It can be seen from the results that levels of filler above 30% by weight cause the bead size of the die-lip build up to increase dramatically.

Figure 3:
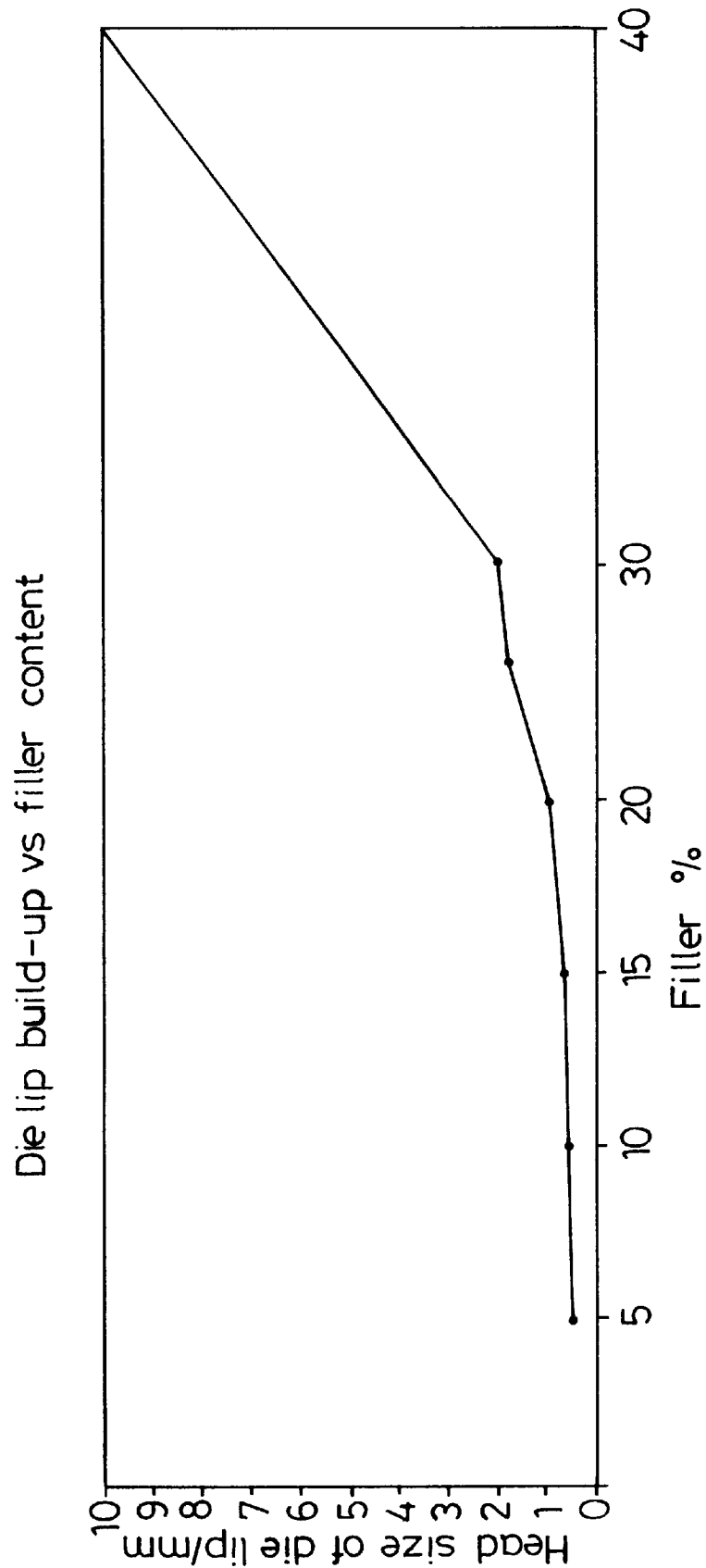
FIG. 3 is a graphical representation of the results of an experiment carried out to determine the effect of increased filler levels in the first and third polymer compositions on the die-lip build up.

FIG. 3 is a graphical representation of the results of Table 1.

TABLE 1

| Filler Level in % by weight | Bead size in mm per 6 hours |
| --- | --- |
| 5 | 0.5 |
| 10 | 0.6 |
| 15 | 0.7 |
| 20 | 1 |
| 30 | 2 |
| 40 | 10 |

Figure 4:
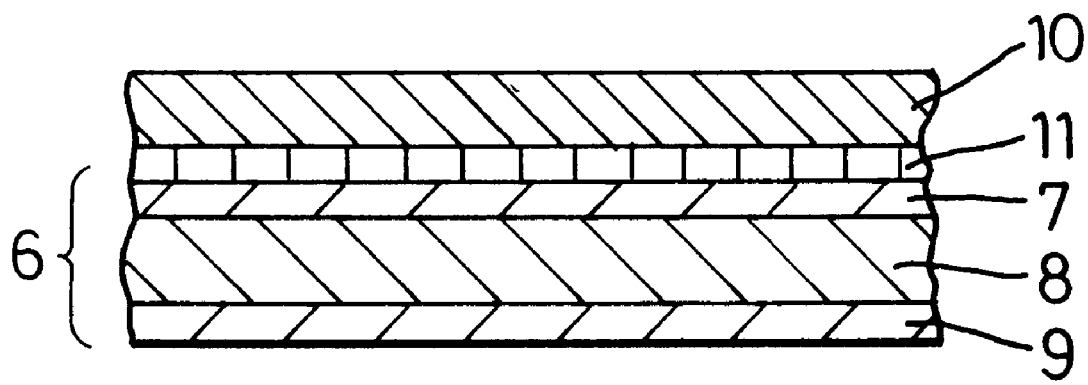
FIG. 4 is a cross section of a tile having a backing film according to the invention.

FIG. 4 illustrates a floor tile having a wear layer 10, a decorative layer 11 and a backing film 6 comprising three laminae 7,8,9 made by the method illustrated by FIG. 2.

EXAMPLES

The invention is illustrated by the following Examples, in which parts and proportions are by weight except where otherwise specified:

COMPARATIVE EXAMPLE

A thermoplastic polymer composition comprising 60 parts of a blend of ethylene/methyl acrylate (EMA) and ethylene/butyl acrylate (EBA) copolymers (Lotryl, Trade Mark, available from Elf-Atochem) (such copolymers and blends thereof commonly being designated EDA), and 40 parts calcium carbonate (Calmote MG, Trade Mark, available from Croxton & Garry Limited) was extruded at temperatures in the range 200–260° C. at melt pressures in the range 25–50 bar through a rectangular die at a velocity of 10 m/min to produce a film of thickness 915 micron (36 thou). Die-lip build-up occurred at such a rate that rolls of material 2 mm in diameter formed and gathered at the exterior lips of the die within 10–15 minutes.

EXAMPLE 1

Three thermoplastic polymer compositions were coextruded under similar conditions to those of the Comparative Example to produce a film consisting of the following laminae:

(1) 50 micron (2 thou) thick, consisting of EMA (75 parts; Lotryl 18MA02, Trade Mark, available from Elf-Atochem), calcium carbonate filler (20 parts; Calmote MG, Trade Mark) and titanium dioxide (5 parts);

(2) 840 micron (33 thou) thick, consisting of EMA (100 parts), Calmote MG (150 parts) china clay (70 parts; a plate-like filler; B-Clay, Trade Mark, available from ECC Limited) and carbon black (10 parts); and (3) 20 micron (0.8 thou) thick, consisting of polyethylene (77 parts; Lacqtene LD0304. Trade Mark, available from Elf-Atochem), Calmote MG (20 parts) and carbon black (3 parts).

Extrusion was continued for 90 minutes. No die-lip buildup was observed at any time.

What is claimed is:

1. A floor covering comprising a thermoplastic solid backing film produced by co-extruding through a die in the following order:
   a first lamina having a first thermoplastic composition that includes from zero to about 30 percent by weight infusible filler;
   a second lamnina having a second thermoplastic composition that includes from about 50 to about 75 percent by weight infusible filler; and
   a third lamina having a third thermoplastic composition which includes from zero to about 30 percent by weight infusible filler; with the first and third thermoplastic compositions being such that when the first and third laminae were extruded through the die there was substantially no die-lip build-up, and the second thermoplastic composition being such that if the second lamina were to be extruded adjacent a die lip there would be significant die lip build up, the first and the third lamina having prevented the second lamina from contacting the die during manufacture of the film, wherein the thickness of the first and third laminae is substantially the same.

2. A thermoplastic solid backing film according to claim 1, wherein the film comprises at least about 50% by weight infusible filler.

3. A thermoplastic solid backing film according to claim 1, wherein the thermoplastic polymers utilised in the first, second and third laminae are the same.

4. A thermoplastic solid backing film according to claim 1, wherein the thermoplastic polymers utilised in at least two of the first, second and third laminae are different.

5. A thermoplastic solid backing film according to claim 1, wherein the first and third polymer compositions additionally comprise a binder polymer.

6. A thermoplastic solid backing film according to claim 1, wherein the polymer compositions additionally comprise minor proportions of substances selected from the group comprising lubricants, antioxidants and stabilisers.

7. A thermoplastic solid backing film according to claim 1, wherein the infusible filler additionally comprises a proportion, of one or more pigments.

8. A thermoplastic solid backing film according to claim 1, which comprises one or more interior laminae additional to the second lamina, provided always that the first and third laminae are disposed at the exterior of the film.

9. A floor covering comprising a thermoplastic solid backing film produced by co-extruding through a die in the following order:
   a first lamina having a first thermnoplastic composition that includes from zero to about 30 percent by weight infusible filler;
   a second larmina having a second thermoplastic composition that includes from about 50 to about 75 percent by weight infusible filler; and
   a third lamina having a third thermoplastic composition which includes from zero to about 30 percent by weight infusible filler; with the first and third thermoplastic compositions being such that when the first and third laminae were extruded through the die there was substantially no die-lip build-up, and the second thermoplastic composition being such that if the second lamina were to be extruded adjacent a die lip there would be significant die lip build up, the first and the third lamina having prevented the second lamnina from contacting the die during manufacture of the film, wherein the thickness of the coextruded film is in the range of about 100 to 2000 microns.

10. A floor covering comprising a thermoplastic solid backing film produced by co-extruding through a die in the following order:
    a first lamina having a first thermoplastic composition that includes from zero to about 30 percent by weight-infusible filler;
    a second lamina having a second thermoplastic composition that includes from about 50 to about 75 percent by weight infusible filler; and
    a third lamina having a third thermoplastic composition which includes from zero to about 30 percent by weight infusible filler; with the first and third thermoplastic compositions being such that when the first and third laminae wire extruded through the die there was substantially no die-lip build-up, and the second thermoplastic composition being such that if the second lamina were to be extruded adjacent a die lip there would be significant die lip build up, the first and the third lamina having prevented the second lamnina from contacting the die during manufacture of the film, wherein the thickness of the second lamina is at least about 45% of the total thickness of the coextruded film.

11. A floor covering comprising a thermoplastic solid backing layer produced by co-extruding through a die in the following order:
    a first lamina having a first thermoplastic composition that includes from zero to about 30 percent by weight infusible filler;
    a second lamnina having a second thermoplastic composition that includes from about 50 to about 75 percent by weight infusible filler; and
    a third lamina having a third thermoplastic composition which includes from zero to about 30 percent by weight infusible filler; with the first and third thermoplastic compositions being such that when the first and third laminae were extruded through the die there was substantially no die-lip build-up, and the second thermoplastic composition being such that if the second lamina were to be extruded adjacent a die lip there would be significant die lip build up, the first and the third lamina having prevented the second lamnina from contacting the die during manufacture of the film, wherein the thickness of the first and third laminae is different.

12. A floor covering according to claim 11, wherein the film comprises at least about 50% by weight infusible filler.

13. A floor covering according to claim 11, wherein the thermoplastic polymers utilized in the first, second and third laminae are the same.

14. A floor covering according to claim 11, wherein the thermoplastic polymers utilized in at least two of the first, second and third laminae are different.

15. A thermoplastic solid backing film according to claim 11, wherein the first and third polymer compositions additionally comprise 5 to 10% of an additional binder polymer.

16. A thermoplastic solid backing film according to claim 11, wherein the polymer compositions additionally comprise minor proportions of substances selected from the group comprising lubricants, antioxidants and stabilizers.

17. A thermoplastic solid backing film according to claim 11, wherein the infusible filler additionally comprises a proportion of one or more pigments.

18. A thermoplastic solid backing film according to claim 11, which comprises one or more interior laminae additional to the second lamina, always provided that the first and third laminae are disposed at the exterior of the film.

19. A floor covering comprising a thermoplastic backing layer produced by co-extruding through a die in the following order:

a first lamnina having a first thermoplastic composition that includes from zero to about 30 percent by weight infusible filler;

a second lamnina having a second thermoplastic composition that includes from about 50 to about 75 percent by weight invisible filler; and a third lamina having a third thermoplastic composition which includes from zero to about 30 percent by weight infusible filler; with the first and third thermoplastic compositions being such that when the first and third laminae were extruded through the die there was substantially no die-lip build-up, and the second thermoplastic composition being such that if the second lamnina were to be extruded adjacent a die lip there would be significant die lip build up, the first and the third lamnina having prevented the second lamnina from contacting the die during manufacture of the film, wherein the thickness of the first and second laminae is in the range of about 10 to 100 microns.

20. A method of manufacturing a floor covering, which comprises:

producing a thermoplastic solid backing film by co-extruding through a die in the following order:

a first lamina having a first thermoplastic composition that includes from zero to about 30 percent by weight infusible filler;

a second lamina having a second thermoplastic composition that includes from about 50 to about 75 percent by weight infusible filler; and a third lamina having a third thermoplastic composition which includes from zero to about 30 percent by weight infusible filler;

with the first and third thermoplastic composition being such that as the first and third laminae are extruded through the die there is substantially no die-lip build up, and the second thermoplastic composition being such that if the second lamina were to be extruded adjacent a die lip there would be significant die lip build up, the first and the third lamina ensuring that the second lamina does not contact the die lip thereby avoiding any die lip build up of the second thermoplastic polymer composition, wherein the thickness of the first and third laminae is substantially the same.

21. A composite laminate resilient floor covering, characterised in that it includes at least one coextruded backing film comprising a first lamina having a first thermoplastic composition that includes from zero to about 30 percent by weight infusible filler, a second lamina having a second thermoplastic composition that includes from about 50 to about 75 percent by weight infusible filler; and a third lamina having a third thermoplastic composition which includes from zero to about 30 percent by weight infusible filler; with the first and third thermoplastic compositions being such that the first and third laminae were extruded with sutantially no die-lip build-up even though extrusion of the second thermoplastic composition would result in significant die lip build up of the second lamina because the first and the third lamina prevented the second lamina from contacting the die during manufacture of the film, wherein the thickness of the first and third laminae is substantially the same.

22. A floor covering characterised in that it comprises at least one coextruded backing film made by co-extruding through a die in the following order:

a first lamina having a first thermoplastic composition that includes from zero to about 30 percent by weight infusible filler, a second lamina having a second thermoplastic composition that includes from about 50 to about 75 percent by weight infusible filler; and a third lamina having a third thermoplastic composition which includes from zero to about 30 percent by weight infusible filler;

with the first and third thermoplastic composition being such that as the first and third laminae are extruded through the die there is substantially no die-lip build up, and the second thermoplastic composition being such that if the second lamina were to be extruded adjacent a die lip there would be significant die lip build up, the first and the third lamina ensuring that the second lamina does not contact the die lip thereby avoiding any die lip build up of the second thermoplastic polymer composition, wherein the thickness of the first and third laminae is substantially the same.

23. A floor tile made of the floor covering of claim 22.

24. A floor covering according to claim 22, wherein[]the first and third laminae have a thickness which is relatively thin compared to that of the second lamina, and each comprises an ethylene vinyl acetate or ethylene alkyl acrylate composition.

25. A composite laminate resilient floor covering, characterized in that it comprises at least one coextruded backing film comprising a first lamina having a first thermoplastic composition that includes from zero to about 30 percent by weight infusible filler, a second lamina having a second thermoplastic composition that includes from about 50 to about 75 percent by weight infusible filler; and a third lamina having a third thermoplastic composition which includes from zero to about 30 percent by weight infusible filler; with the first and third laminae eliminating die lip build up by preventing the second lamina from contacting an extrusion die during manufacture of the film.

26. A floor covering characterized in that it comprises at least one coextruded backing film made by co-extruding through a die in the following order:

a first lamina having a first thermoplastic composition that includes from zero to about 30 percent by weight infusible filler;

a second lamina having a second thermoplastic composition that includes from about 50 to about 75 percent by weight infusible filler; and a third lamina having a third thermoplastic composition which includes from zero to about 30 percent by weight infusible filler;

with the first and third thermoplastic composition being such that as the first and third laminae are extruded through the die there is substantially no die-lip build up, and the second thermoplastic composition being such that if the second lamina were to be extruded adjacent a die lip there would be significant die lip build up, the first and the third lamina ensuring that the second lamina does not contact the die lip thereby avoiding any die lip build up of the second thermoplastic polymer composition, wherein the thickness of the first and third laminae is different.

27. A floor tile made of the floor covering of claim 26.

28. A floor covering according to claim 26, wherein the first and third laminae have a thickness which is relatively thin compared to that of the second lamina, and each comprises an ethylene vinyl acetate or ethylene alkyl acrylate composition.

29. A method of manufacturing a floor covering, which comprises:

producing a thermoplastic solid backing film by co-extruding through a die in the following order:

a first lamina having a first thermoplastic composition that includes from zero to about 30 percent by weight infusible filler;

a second lamina having a second thermoplastic composition that includes from about 50 to about 75 percent by weight infusible filler; and a third lamnina having a third thermoplastic composition which includes from zero to about 30 percent by weight infusible filler; with the first and third thermoplastic composition being such that as the first and third lamnina are extruded through the die there is substantially no die-lip build up, and the second thermoplastic composition being such that if the second lamina were to be extruded adjacent a die lip there would be significant die lip build up, the first and the third lamina ensuring that the second lamina does not contact the die lip thereby avoiding any die lip build up of the second thermoplastic polymer composition, wherein the thickness of the first and third laminae is different.

* * * * *